US009103502B2

(12) United States Patent
Beebe et al.

(10) Patent No.: US 9,103,502 B2

(45) Date of Patent: Aug. 11, 2015

(54) METHOD AND DEVICE FOR CONTROLLED LAMINAR FLOW PATTERNING WITHIN A CHANNEL

(75) Inventors: David J. Beebe, Monona, WI (US); Jay Warrick, Madison, WI (US); Erwin Barthler, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 98 days.

(21) Appl. No.: 13/450,759

(22) Filed: Apr. 19, 2012

(65) Prior Publication Data

US 2013/0276890 A1 Oct. 24, 2013

(51) Int. Cl.

*F17D 3/00* (2006.01)
*F16L 41/00* (2006.01)
*B01L 3/00* (2006.01)

(52) U.S. Cl.

CPC ................. *F17D 3/00* (2013.01); *B01L 3/5027* (2013.01); *B01L 3/50273* (2013.01); *B01L 3/502715* (2013.01); *B01L 3/502776* (2013.01); *B01L 2200/0605* (2013.01); *B01L 2200/10* (2013.01); *B01L 2300/087* (2013.01); *B01L 2300/0816* (2013.01); *B01L 2300/0867* (2013.01); *B01L 2400/084* (2013.01); *Y10T 137/0318* (2015.04); *Y10T 137/85938* (2015.04)

(58) Field of Classification Search

USPC ........................................ 422/68.1, 502–507

See application file for complete search history.

(56) References Cited

U.S. PATENT DOCUMENTS

| | | | | |
|---|---|---|---|---|
| 6,213,151 | B1 * | 4/2001 | Jacobson et al. | 137/827 |
| 6,632,619 | B1 * | 10/2003 | Harrison et al. | 435/7.2 |
| 7,291,497 | B2 * | 11/2007 | Holmes et al. | 435/287.2 |
| 2005/0003554 | A1 * | 1/2005 | Brasseur | 436/172 |
| 2006/0062852 | A1 * | 3/2006 | Holmes | 424/484 |
| 2006/0272945 | A1 * | 12/2006 | Manz et al. | 204/451 |
| 2009/0217742 | A1 * | 9/2009 | Chiu et al. | 73/61.55 |
| 2010/0140171 | A1 * | 6/2010 | Heath et al. | 210/637 |
| 2011/0033922 | A1 * | 2/2011 | Landers et al. | 435/325 |
| 2011/0212509 | A1 * | 9/2011 | Beebe et al. | 435/283.1 |
| 2012/0040370 | A1 * | 2/2012 | Orwar et al. | 435/7.2 |
| 2012/0273702 | A1 * | 11/2012 | Culbertson et al. | 251/129.01 |

* cited by examiner

*Primary Examiner* — Jennifer Wecker

(74) *Attorney, Agent, or Firm* — Boyle Fredrickson, S.C.

(57) ABSTRACT

A device and method of laminar flow patterning of at least one sample fluid in a main channel in a microfluidic device are provided. A first input channel is provided in the microfluidic device. The first input channel has an output end communicating with the first end of the main channel and an input end communicating with a first input port. A buffer fluid is deposited in the main channel and the first input channel and a first sample fluid is deposited in the first input port. A first pressure is generated in response to the depositing of the first sample fluid in the first input port so as to cause laminar flow of the first sample fluid in the main channel.

8 Claims, 5 Drawing Sheets

METHOD AND DEVICE FOR CONTROLLED LAMINAR FLOW PATTERNING WITHIN A CHANNEL

REFERENCE TO GOVERNMENT GRANT

This invention was made with government support under W81XWH-09-1-0192 awarded by the ARMY/MRMC. The government has certain rights in the invention.

FIELD OF THE INVENTION

This invention relates generally to microfluidic devices, and in particular, to a method and a device for controlled laminar flow patterning within a channel of a microfluidic device.

BACKGROUND AND SUMMARY OF THE INVENTION

An increasing number of biological studies reveal the strong interaction between different cellular compartments in vivo. To accurately study and model these phenomena in vitro, traditional cell-biology platforms have been used on the periphery of their designed use. Microfluidic and microfabricated platforms are a natural fit for these applications as they provide unique capabilities to controllably place different cellular compartments in two-dimensional (2D) or three-dimensional (3D) matrices. Two main fluidic approaches have been demonstrated to achieve this task. The first fluidic approach segregates liquid compartments by providing a highly resistive fluidic path, such as a diffusion channel or a membrane, thereby allowing a user to load in contiguous chambers multiple cell types. This approach has proven to enable multi-culture of up to 5 cell types, as well as, increase the sensitivity as compared to traditional transwell dishes. The second fluidic approach leverages laminar (i.e. not turbulent) flow properties to fluidically pattern the different cell types in a channel. Laminar flow is employed by flowing two streams, side-by-side, within a channel in order to pattern cells, particles, and treatments. Laminar flow may also be used for developing gradients, where one chemical diffuses laterally from one stream into the other. It can be appreciated that this method maximizes the efficiency of the soluble factor signaling as the exchange of soluble factors is highest, while the volume per cell ratio is low.

Currently, there are no methods for reproducibly controlling laminar flow in a practical way. Hence, this fluidic approach remains seriously underutilized. Further, traditional microfluidic methods for reproducibly controlling laminar flow are not readily amendable to biological studies due to limitations such as connectivity problems (tubing, dead volumes, air bubbles, etc.). Recently, microdevices have been developed to alleviate these issues by integrating seamlessly with traditional equipment from the biology lab. These microdevices utilize surface tension-driven pumping or gravity pumping with a simple micropipette. In cell-based applications, the loading volumes are finite, usually from 1 to 10 μL, and the process is sequential. Therefore, flow patterning methods are more difficult to achieve as the flow varies over time. In particular, since the flow is limited in time, any differences in pressures occurring at the end of the motion will induce large changes in patterning. Further, the use syringe pumps to achieve laminar flow requires exact timing to achieve desirable results. This is due to the need to synchronize flows to avoid causing one stream to flow into the region of another, thereby disturbing the pattern.

Therefore, it is a primary object and feature of the present invention to provide a device for controlled laminar flow patterning of at least one sample fluid in a channel of a microfluidic device.

It is a further object and feature of the present invention to provide a method of laminar flow patterning of at least one sample fluid in a main channel in a microfluidic device.

It is a still further object and feature of the present invention to provide a device and a method of laminar flow patterning of at least one sample fluid in a main channel in a microfluidic device that is simple and inexpensive to implement.

In accordance with the present invention, a device is provided for controlled laminar flow patterning of at least one sample fluid. The device includes a body defining a channel network. The channel network includes a main channel extending along a longitudinal axis and having a first end and a second end defining an output port. A first input channel has an output end communicating with the first end of the main channel and an input end communicating with a first input port. The first input channel has a fluidic resistance. The channel network further includes a fluidic capacitor and a first buffering channel. The first buffering channel has a first end communicating with the first input channel and the first input port and a second end communicating with the fluidic capacitor. The first buffering channel has a fluidic resistance less than the fluidic resistance of the first input channel.

The channel network in the body of the device further includes a second input channel having an output end communicating with the first end of the main channel and an input end communicating with either the first input port or, alternatively, with a second input port. The second input channel having fluidic resistance. In the alternate embodiment, a second buffering channel has a first end communicating with the second input channel and the second input port and a second end communicating with the fluidic capacitor. The second buffering channel has a fluidic resistance less than the fluidic resistance of the second input channel.

A buffering fluid may be provided within the channel network and the at least one sample fluid may include a first sample fluid and a second sample fluid. It is intended for the fluidic capacitor to urge laminar flow of the first and second sample fluids in the main channel in response to the asynchronous depositing of the first sample fluid in the first input port and the second sample fluid in the second input port. Further, it is contemplated for the first and second input channels to have cross sectional areas and for the first and second buffering channels to have cross sectional areas. The cross sectional area of the first buffering channel is greater than the cross sectional area of the first input channel and the cross sectional area of the second buffering channel is greater than the cross sectional area of the second input channel. Similarly, the fluid capacitor, the first input port and the second input port have cross sectional areas. The cross sectional area of the fluid capacitor is greater than the cross sectional areas of the first and second input ports.

In accordance with a further aspect of the present invention, a method is provided of laminar flow patterning of at least one sample fluid in a main channel in a microfluidic device. The method includes the step of providing a first input channel in the microfluidic device. The first input channel has an output end communicating with the first end of the main channel and an input end communicating with a first input port. A buffer fluid is deposited in the main channel and in the first input channel. A first sample fluid is deposited in the first input port and a first pressure is generated in response to the depositing of the first sample fluid in the first input port. The first pressure causes laminar flow of the first sample fluid in the main channel.

A fluidic capacitor may be provided in communication with the first input channel and the buffer fluid being received in the fluidic capacitor. The buffer fluid in the fluidic capacitor has a surface tension pressure and the pressure causing laminar flow of the first sample fluid in the main channel is the surface tension pressure of the buffer fluid in the fluidic capacitor.

The method may include the additional step of providing a second input channel in the microfluidic device. The second input channel has an output end communicating with the first end of the main channel and an input end communicating with a second input port. The buffer fluid is deposited in the second input channel and a second sample fluid is deposited in the second input port. A second pressure is generated in response to the depositing of the second sample fluid in the second input port. The second pressure combines with the first pressure to provide a total pressure for causing laminar flow of the first and second sample fluids in the main channel along corresponding flow paths. In addition, the flow paths of the first and second sample fluids have corresponding widths. The widths of the flow paths are proportional to the fluidic resistances of the flow paths.

The method may also include the additional step of providing a fluidic capacitor in communication with the first and second input channels. The buffer fluid is received in the fluidic capacitor. The buffer fluid in the fluidic capacitor has a surface tension pressure and the total pressure causing laminar flow of the first and second sample fluids in the main channel is the surface tension pressure of the buffer fluid in the fluidic capacitor.

A second input channel may be provided in the microfluidic device. The second input channel has an output end communicating with the first end of the main channel and an input end communicating with a first input port. The buffer fluid is deposited in the second input channel. A first portion of the first sample fluid flows along a first flow path in the main channel and a second portion of the first sample fluid flows along a second flow path in the main channel.

In accordance with a still further aspect of the present invention, a method is provided of laminar flow patterning of at least one sample fluid in a flow channel in a microfluidic device. The method includes the step of providing a first input flow path between a first input port and the flow channel. The first flow path has a fluidic resistance. A first sample fluid is deposited in the first input port and a first pressure in response to the depositing of the first sample fluid in the first input port. The first pressure causes laminar flow of the first sample fluid in the fluid channel.

A fluidic capacitor may be provided in communication with the first input flow path and the first input port through a first buffering flow path. The first buffering flow path has a fluidic resistance less than the fluidic resistance of the first input flow path. The step of generating the first pressure includes the additional step of depositing a buffer fluid in the fluidic capacitor. The buffer fluid has a surface tension pressure and the pressure causing laminar flow of the first sample fluid in the flow channel is the surface tension pressure of the buffer fluid in the fluidic capacitor.

A second input flow path is provided between a second input port and the flow channel. The second flow path has a fluidic resistance. A second sample fluid is deposited in the second input port and a second pressure is generated in response to the depositing of the second sample fluid in the second input port. The second pressure combines with the first pressure to provide a total pressure for causing laminar flow of the first and second sample fluids in the flow channel along corresponding flow paths. The flow paths of the first and second sample fluids within the flow channel have corresponding widths. The widths of the flow paths in the flow channel are proportional to the fluidic resistances of the flow paths.

Alternatively, the second input flow path may communicates with flow channel and the first input port. As such, the first pressure causes laminar flow of a first portion of the first sample fluid along a first flow path in the flow channel and laminar flow of a second portion of the first sample fluid along a second flow path in the flow channel.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
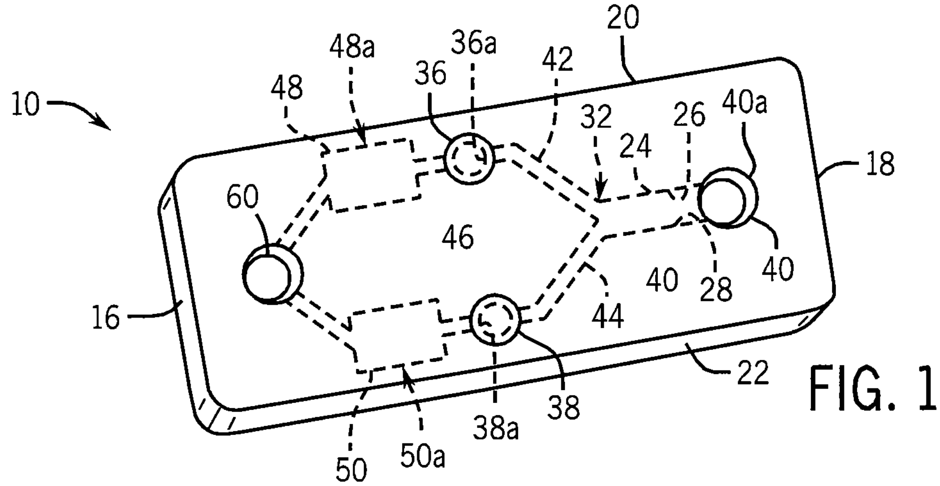
FIG. 1 is an isometric view of a device for effectuating a methodology in accordance with the present invention.
Figure 2:
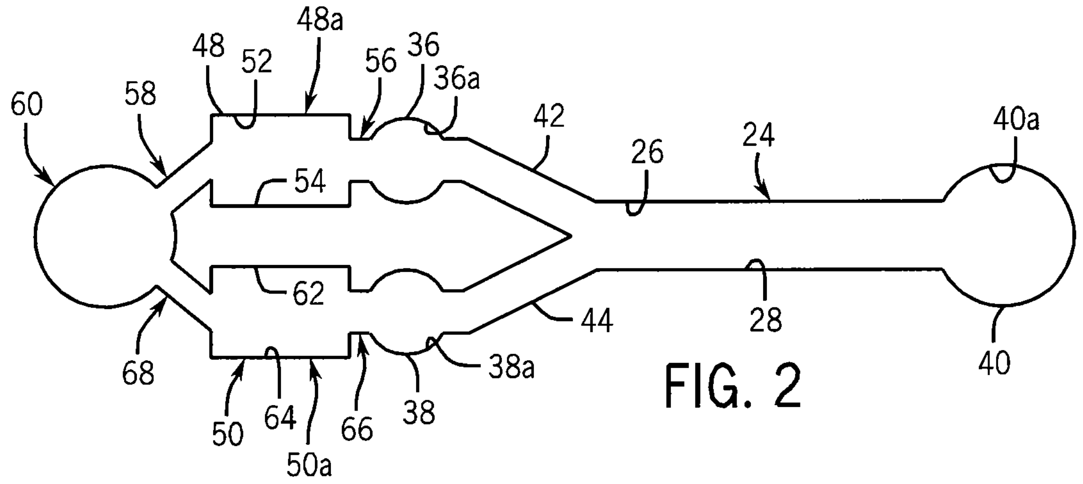
FIG. 2 is a schematic, top plan view of a channel network for the device of FIG. 1.
Figure 3:
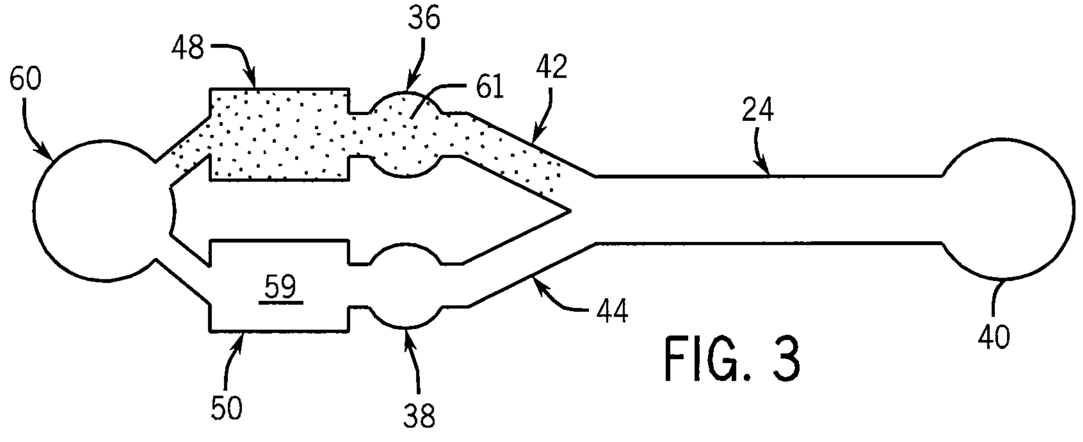
FIG. 3 is a schematic, top plan view of the channel network of FIG. 2 after a first sample fluid is loaded.
Figure 4:
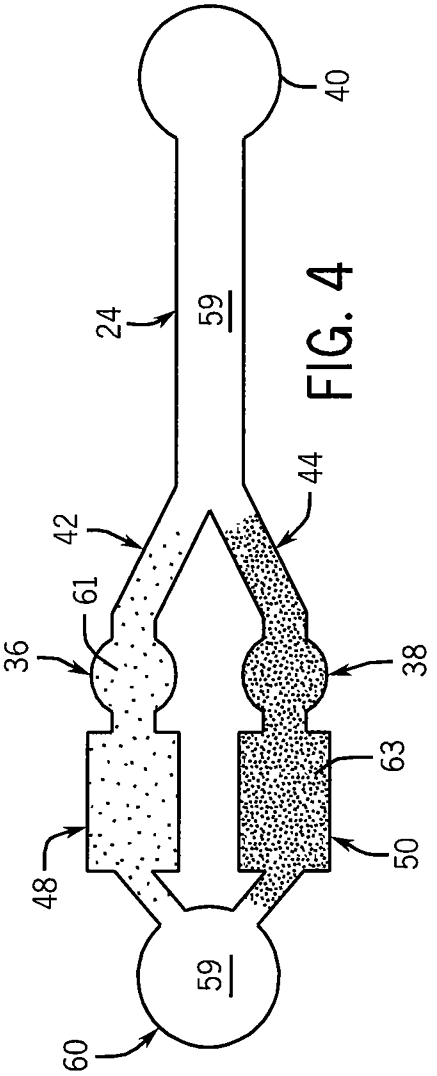
FIG. 4 is a schematic, top plan view of the channel network of FIG. 2 after a second sample fluid is loaded.
Figure 5:
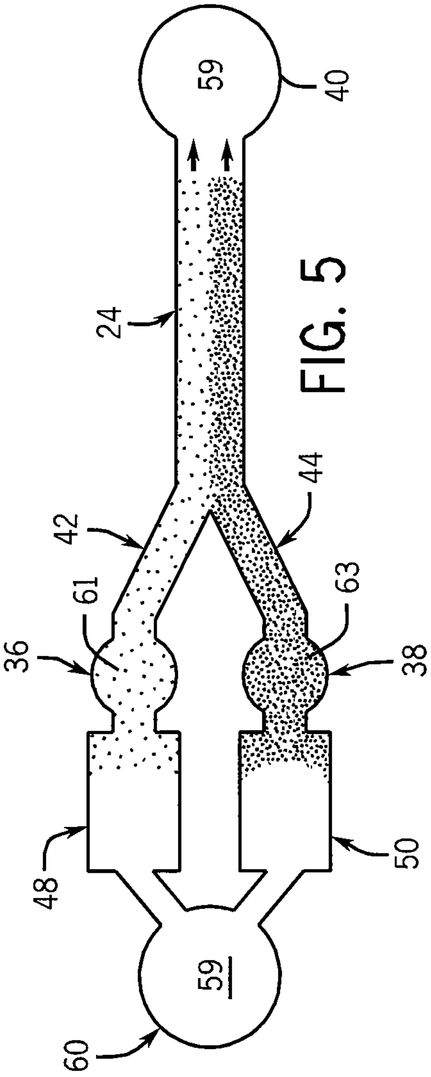
FIG. 5 is a schematic, top plan view of the channel network of FIG. 2 depicting laminar flow of the first and second sample fluids in a main channel.

Referring to FIGS. 1-5, an exemplary device for effectuating the methodology of the present invention is generally designated by the reference numeral 10. Device 10 includes first and second ends 16 and 18, respectively, and first and second sides 20 and 22, respectively. Main channel 24 extends through device 10 along a longitudinal axis and is defined by first and second spaced sidewalls 26 and 28, respectively. Main channel 24 further includes first end 32 that communicates with first and second input ports 36 and 38, respectively, through first and second diverging input channels 42 and 44, respectively, and second end 34 the communicates with output port 40. First and second input ports 36 and 38, respectively, and output port 40 communicate with upper surface 46 of device 10.

It is contemplated for output port 40 of main channel 24 to have a generally cylindrical shape to allow for robust and easy access via droplet touch off using a micropipette of a robotic micropipetting station. In addition, a portion of upper surface 46 of device 10 about outlet port 40 or inner surface 40*a* defining outlet port 40 may be physically or structurally patterned to contain fluid droplets within/adjacent outlet port 40. It is further contemplated for the portions of upper surface 46 about first and second input ports 36 and 38, respectively, and for the inner surfaces 36*a* and 38*a*, respectively, defining first and second input ports 36 and 38, respectively, to be physically, chemically or structurally patterned to contain fluid drops therein and prevent cross channel contamination. Similarly, each input port 36 and 38 may have a generally cylindrical shape to allow for robust and easy access via droplet touch off using a micropipette.

Device 10 includes further includes first and second reservoir channels 48 and 50, respectively. First reservoir channel 48 is defined by first and second spaced sidewalls 52 and 54, respectively, and includes first end 56 that communicates with first input port 36 and second end 58 that communicates with buffering reservoir 60. Buffering reservoir 60 communicates with upper surface 46 of device 10. First reservoir channel 48 includes a wide diameter portion 48*a*, for reasons hereinafter described. Second reservoir channel 50 is defined by first and second spaced sidewalls 62 and 64, respectively, and includes first end 66 that communicates with second input port 38 and second end 68 that communicates with reservoir port 60. Second reservoir channel 50 includes a wide diameter portion 50*a*, for reasons hereinafter described. It is contemplated for buffering reservoir 60 to have a generally cylindrical configuration with an open upper end that communicates with upper surface 46 of device 10.

As hereinafter described, laminar flow synchronization of first and second fluidic samples in main channel 24 is achieved by providing wide diameter portions 48*a* and 50*a* in first and second reservoir channels 48 and 50, respectively, in fluid communication with first and second input ports 36 and 38, respectively, and by providing a common buffering reservoir 60 which acts as a fluidic capacitor, as hereinafter described. More specifically, in operation, device 10 is filled with a buffer fluid 59. First and second fluidic samples, 61 and 63, respectively, are deposited in corresponding first and second input ports 36 and 38, respectively. The surface tension-generated pressures provided by first and second fluidic samples 61 and 63, respectively, in first and second input ports 36 and 38, respectively, and by the buffer fluid 59 in buffering reservoir 60 act as fluid capacitors with capacitances related to the corresponding radii of first and second input ports 36 and 38, respectively, and buffering reservoir 60. For example, a large port, such as buffering reservoir 60, is able to contain a large volume of fluid, and as such, acts as a weak capacitor. Alternatively, a small port, such as input ports 36 and 38, acts as a stiffer capacitor thereby generating larger pressures when fluid is added. When first fluidic sample 61 is added to first input port 36, a relatively large pressure is generated, causing flow of the first fluidic sample 61 into first reservoir channel 48 towards buffering reservoir 60, FIG. 3. Subsequently, the surface tension-generated pressure provided by the buffer fluid 59 in buffering reservoir 60 urges the buffer fluid 59 from buffering reservoir 60, thereby urging the first fluidic sample 61 from first reservoir channel 48, through first input channel 42 and into main channel 24. Similarly, when the second fluidic sample 63 is added to second input port 38, FIG. 4, a relatively large pressure is generated, causing flow of the second fluidic sample 63 into second reservoir channel 50 towards buffering reservoir 60. Subsequently, the surface tension-generated pressure provided by the buffer fluid 59 in buffering reservoir 60 urges the buffer fluid 59 from buffering reservoir 60, thereby urging the second fluidic sample 63 from second reservoir channel 50, through second input channel 44 and into main channel 24, FIG. 5.

Figure 6:
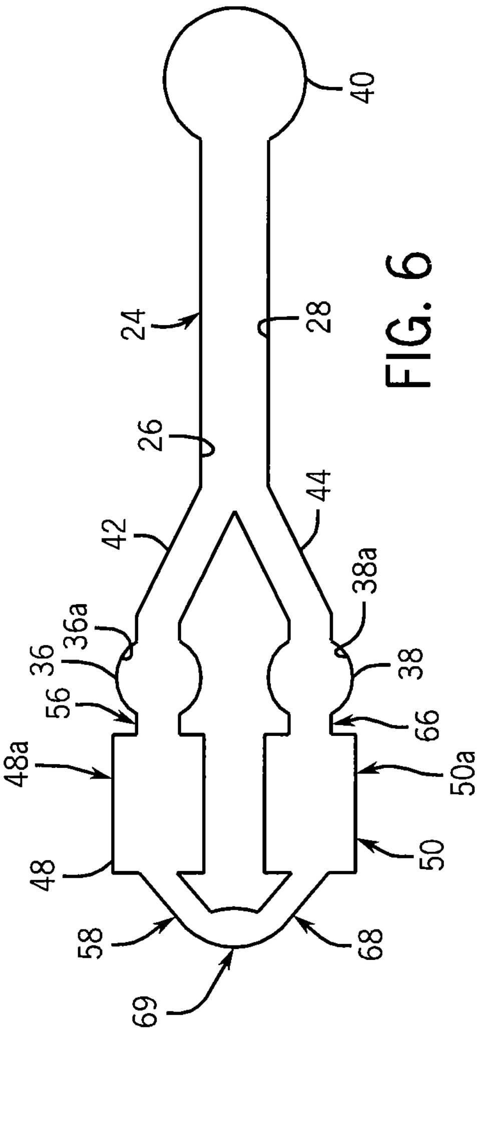
FIG. 6 is a schematic, top plan view of an alternate embodiment of a channel network of a device for effectuating the methodology of the present invention.

It is noted that other configurations of the buffering reservoir are contemplated as being within the scope of the present invention. By way of example, referring to FIG. 6, second end 58 of first reservoir channel 48 and second end 68 of second reservoir channel 50 are interconnected by a buffering reservoir such as enlarged reservoir channel 69. As such, when first fluidic sample 61 is added to first input port 36, a relatively large pressure is generated, causing flow of the first fluidic sample into first reservoir channel 48 towards reservoir channel 69. Subsequently, the pressure provided by the buffer fluid in reservoir channel 69 urges the buffer fluid from reservoir channel 69, thereby urging the first fluidic sample 61 from first reservoir channel 48, through first input channel 42 and into main channel 24. Similarly, when the second fluidic sample 63 is added to second input port 38, a relatively large pressure is generated, causing flow of the second fluidic sample 63 into second reservoir channel 50 towards reservoir channel 69. Subsequently, the pressure provided by the buffer fluid in reservoir channel 69 urges the buffer fluid from reservoir channel 69, thereby urging the second fluidic sample 63 from second reservoir channel 50, through second input channel 44 and main channel 24.

As described, the loading of fluidic samples in either the first or second input ports 36 and 38, respectively, charges the common capacitor, e.g. buffering reservoir 60 or reservoir channel 69, so as to trigger flow in first and second reservoir channels 48 and 50, respectively, and hence, into main channel 24. Therefore, it can be appreciated that the first and second fluidic samples 61 and 63, respectively, can be added asynchronously to first and second input ports 36 and 38, respectively, without variation of the relative flow rates in first and second reservoir channels 48 and 50, respectively, and first and second diverging input channels 42 and 44, respectively.

It has been found that synchronization of the flows from first and second input channels 42 and 44, respectively, into main channel 24 occurs rapidly (e.g., within 15 ms). However, thereafter, the flows from first and second input channels 42 and 44, respectively, into main channel 24 closely match each other. As such, synchronization occurs on the time scale required to flow the entire fluidic sample towards from buffering reservoir 60. Therefore, to achieve the best results this time should be minimized. This can be achieved by reducing radius of first and second input ports 36 and 38, respectively; decreasing the volume of the fluidic samples supplied at first and second input ports 36 and 38, respectively; and reducing the resistance between first and second input ports 36 and 38, respectively, and buffering reservoir 60.

Before synchronization, the flow rate in the first input channel 42 corresponding to the first input port 36 wherein the first fluidic sample 61 was initially supplied is higher than the flow rate in the second input channel 44 wherein the second fluidic sample had yet to be supplied. To ensure proper fluidic patterning in main channel 24, it is important to prevent the first fluidic sample 61 initially supplied at first input port 36 from entering main channel 24 prior to the loading of the second fluidic sample 63 in second input port 24. It has been found that the time it takes for a volume of fluid added to a first side of a channel to reach the other side of the channel is a factor of the volume of the channel and the aspect ratio of the channel. In the device 10, it is contemplated for the aspect factor of the first and second input channels 42 and 44, respectively, to be always greater than 0.48. Hence, the maximum volume of fluid that is allowed to flow into first input channel 42 prior to synchronization is roughly half of the volume of first input channel 42. The volume of the fluidic sample 61 that flows into first input channel 42 prior to synchronization can be minimized by reducing the flow rate of the fluidic sample 61 into first input channel 42. This may be accomplished by increasing the fluidic resistance of first input channel 42 or by increasing the length of first and second input channels 42 and 44, respectively.

In order to prevent contamination of buffering reservoir 60, the volume of the fluidic samples loaded into first and second input ports 36 and 38, respectively, must be small enough such that fluidic samples do not flow into buffering reservoir 60. Furthermore, the ratio of the fluidic resistance of first input channel 42 to the fluidic resistance of second input channel 44 should be equal to the desired ratio of the width patterning of the first and second fluidic samples in main channel 24. For example, the fluidic resistance of first input channel 42 and the fluidic resistance of second input channel 44 should be generally equal for the width patterning of the first and second fluidic samples in main channel 24 to be generally equal.

Alternatively, other ratios of the width patterning of the first and second fluidic samples 61 and 63, respectively, in main channel 24 are possible without varying the scope of the present invention. For example, in order for the width patterning of the first and second fluidic samples 61 and 63, respectively, in main channel 24 to have a ratio of 2/3 of the first sample fluid 61 to 1/3 of the second sample fluid 63, the ratio of the fluidic resistances of first and second diverging input channels 42 and 44, respectively, must be adjusted accordingly.

It is also noted that the timing of the loading of the first and second fluidic samples 61 and 63, respectively, in main channel 24 is not an important factor in generating laminar flow in main channel 24. Even if the second fluidic sample 63 is loaded in second input port 38 after the first fluidic sample 61 loaded in first input port 36 has entirely flown into the main channel 24, the loading of the second fluidic sample 63 in second input port 38 will "re-load" the pressure generated by the fluidic capacitor such that the fluidic capacitor urges the second fluidic sample 63 from second reservoir channel 50, through second input channel 44 and into main channel 24.

Figure 7:
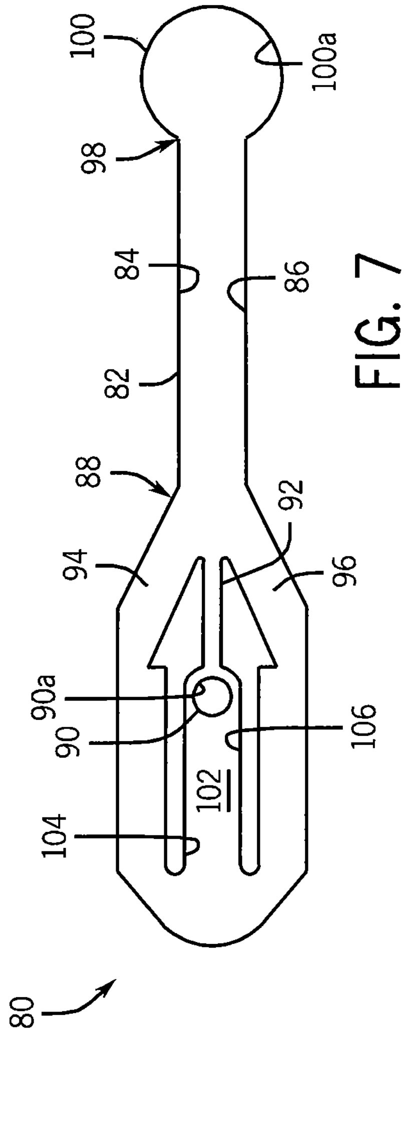
FIG. 7 is a schematic, top plan view of a still further embodiment of a channel network of a device for effectuating the methodology of the present invention.
Figure 8:
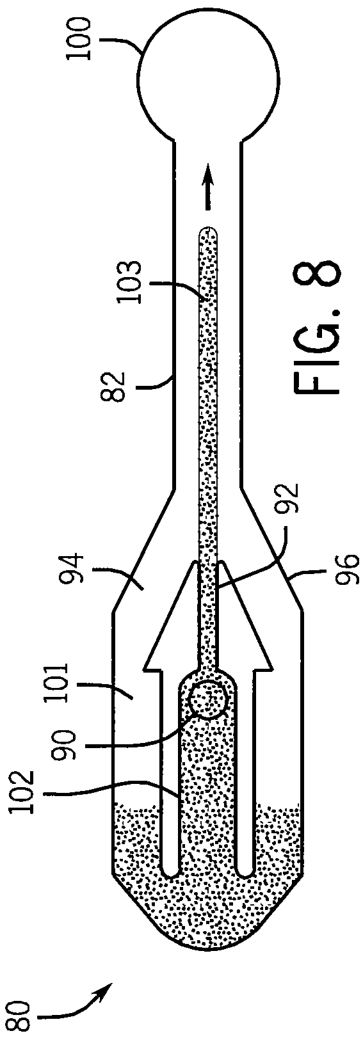
FIG. 8 is a schematic, top plan view of the channel network of FIG. 7 after loading.

Referring to FIGS. 7-8, an alternate channel network for device 10 is generally designated by the reference numeral 80. Channel network 80 includes main channel 82 extending along a longitudinal axis and is defined by first and second spaced sidewalls 84 and 86, respectively. Main channel 82 further includes first end 88 that communicates with input port 90 through input channel 92 and with first and second diverging reservoir channels 94 and 96, respectively, and second end 98 that communicates with output port 100. Input port 90 and output port 100 communicate with upper surface 46 of device 10.

It is contemplated for output port 100 of main channel 82 to have a generally cylindrical shape to allow for robust and easy access via droplet touch off using a micropipette of a robotic micropipetting station. In addition, a portion of upper surface 46 of device 10 about outlet port 100 or inner surface 100*a* defining outlet port 100 may be physically or structurally patterned to contain fluid droplets within/adjacent outlet port 100. It is further contemplated for the portions of upper surface 46 about input port 90 and for the inner surface 90*a* defining input port 90 to be physically, chemically or structurally patterned to contain fluid drops therein and prevent cross channel contamination. Similarly, input port 90 may have a generally cylindrical shape to allow for robust and easy access via droplet touch off using a micropipette.

Channel network 80 of device 10 further includes third reservoir channel 102 defined by first and second spaced sidewalls 104 and 106, respectively, and includes first end 108 that communicates with first input port 90 and second end 110 that communicates with first and second diverging reservoir channels 94 and 96, respectively. Third reservoir channel 102 has a diameter greater the input channel 92 such that third reservoir channel 102 has less fluidic resistance than input channel 92. As hereinafter described, it is intended for first, second and third reservoir channels 94, 96 and 102, respectively, act as a fluidic capacitor so as to urge a fluidic sample loaded at input port 90 through input channel 92 and main channel 82.

Referring to FIG. 8, in operation, channel network 80 of device 10 is filled with a buffer fluid 101. A fluidic sample 103 is deposited in input port 90 such that a surface tension-generated pressure is provided by the fluidic sample 103 in input port 90. As previously described, a relatively large pressure is generated, causing flow of the fluidic sample 103 into third reservoir channel 102. Subsequently, the surface tension-generated pressure provided by first, second and third reservoir channels 94, 96 and 102, respectively, urge the fluidic sample 103 from third reservoir channel 102, through input channel 92 and into main channel 82, thereby allowing for laminar flow and patterning of the fluidic sample through main channel 82.

Figure 9:
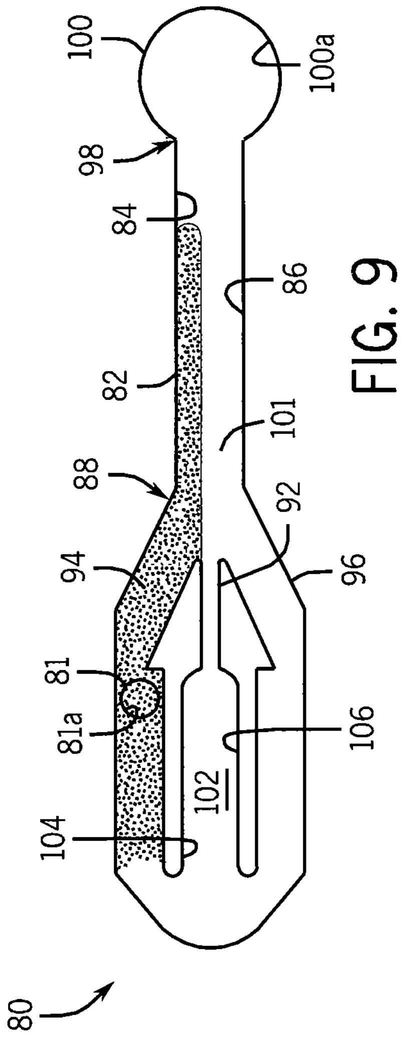
FIG. 9 is a schematic, top plan view of a channel network, similar to FIG. 7, after loading.

Alternatively, as best seen in FIG. 9, an input port 81 may be provided in either first and second diverging reservoir channels 94 and 96, respectively, instead of third reservoir channel 102. By way of example, input port 81 is provided in first reservoir channel 94 and communicates with upper surface 46 of device 10. It is contemplated for the portions of upper surface 46 about input port 81 and for the inner surface 81*a* defining input port 81*a* to be physically, chemically or structurally patterned to contain fluid drops therein and prevent cross channel contamination. Similarly, input port 81 may have a generally cylindrical shape to allow for robust and easy access via droplet touch off using a micropipette.

In operation, channel network 80 of device 10 is filled with a buffer fluid 101. A fluidic sample 103 is deposited in input port 81 such that a surface tension-generated pressure is provided by the fluidic sample 103 in input port 81. A relatively large pressure is generated, causing flow of the fluidic sample 103 into first reservoir channel 94. Subsequently, the surface tension-generated pressure provided by first, second and third reservoir channels 94, 96 and 102, respectively, urge the fluidic sample 103 from first reservoir channel 94 and into main channel 82, thereby allowing for laminar flow and patterning of the fluidic sample through main channel 82.

Figure 10:
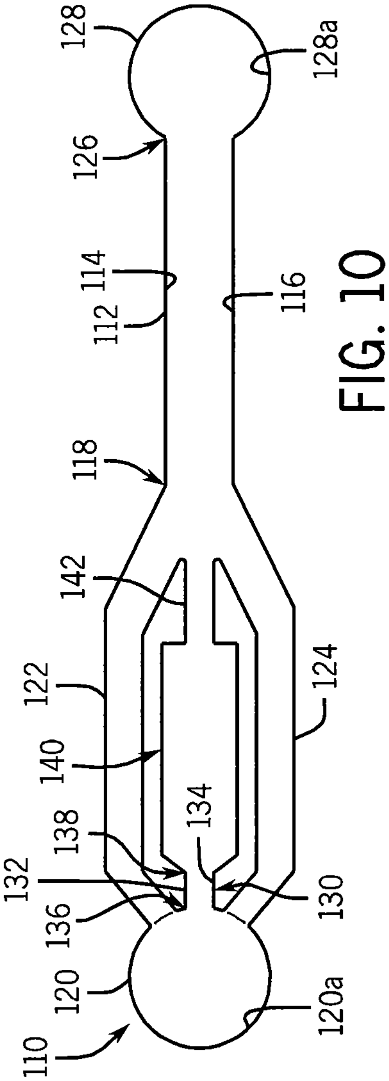
FIG. 10 is a schematic, top plan view of a still further embodiment of a channel network of a device for effectuating the methodology of the present invention.
Figure 11:
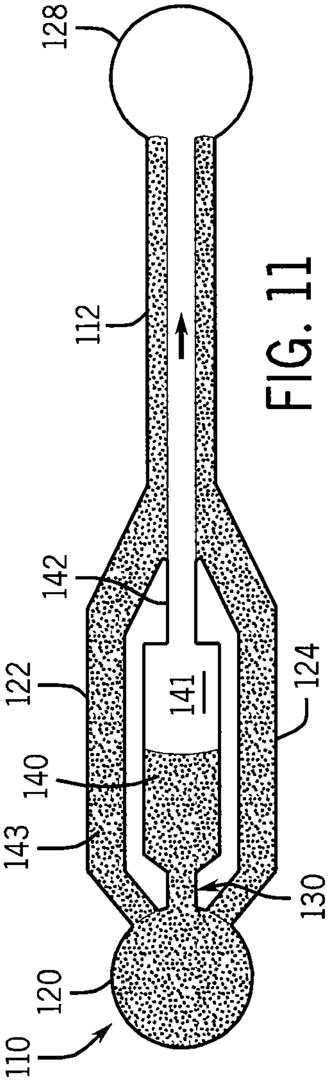
FIG. 11 is a schematic, top plan view of the channel network of FIG. 9 after loading.

Referring to FIGS. 10-11, a still further embodiment of a channel network for device 10 is generally designated by the reference numeral 110. Channel network 110 includes main channel 112 extending along a longitudinal axis and is defined by first and second spaced sidewalls 114 and 116, respectively. Main channel 112 further includes first end 118 that communicates with input port 120 through first and second diverging input channels 122 and 124, respectively, and second end 126 that communicates with output port 128. Input port 120 and output port 128 communicate with upper surface 46 of device 10.

It is contemplated for output port 128 of main channel 112 to have a generally cylindrical shape to allow for robust and easy access via droplet touch off using a micropipette of a robotic micropipetting station. In addition, a portion of upper surface 46 of device 10 about outlet port 128 or inner surface 128*a* defining outlet port 128 may be physically or structurally patterned to contain fluid droplets within/adjacent outlet port 128. It is further contemplated for the portions of upper surface 46 about input port 120 and for the inner surface 120*a* defining input port 120 to be physically, chemically or structurally patterned to contain fluid drops therein and prevent cross channel contamination. Similarly, input port 120 may have a generally cylindrical shape to allow for robust and easy access via droplet touch off using a micropipette.

Channel network 110 of device 10 further includes reservoir channel 130 defined by first and second spaced sidewalls 132 and 134, respectively, and includes first end 136 that communicates with input port 120 and second end 138 that communicates with buffering reservoir 140. Buffering reservoir 140 communicates with upper surface 46 of device 10 and is in fluid communication with main channel 112 through buffering channel 142.

Referring to FIG. 11, in operation, channel network 110 of device 10 is filled with a buffer fluid 141. A fluidic sample 143 is deposited in input port 120 such that surface tension-generated pressure is provided by the fluidic sample 143 in input port 120. As previously described, the relatively large pressure generated at input port 120 causes flow of the fluidic sample 143 into buffering reservoir 140. Subsequently, the surface tension-generated pressure provided by buffering reservoir 140 urges the fluidic sample 143 through first and second input channels 122 and 124, respectively, and into main channel 24, thereby allowing for laminar flow and patterning of the fluidic sample 143 through main channel 82.

Various modes of carrying out the invention are contemplated as being within the scope of the following claims particularly pointing out and distinctly claiming the subject matter which is regarded as the invention.

We claim:

1. A device for controlled laminar flow patterning of at least one sample fluid, comprising:

a body defining a channel network, the channel network including:

a main channel extending along a longitudinal axis and having a first end and a second end defining an output port;

a first input port, the first input port adapted for receiving a first sample fluid of the of at least one sample fluid and for introducing the first sample fluid into the channel network;

a first input channel having an output end interconnected to and communicating with the first end of the main channel and an input end interconnected to and communicating with the first input port, the first input channel having a fluidic resistance;

a fluidic capacitor for receiving a buffer find having a surface tension therein; and a first buffering channel having a first end directly interconnected to and communicating with the first input port and a second end interconnected to and communicating with the fluidic capacitor, the first buffering channel configured to have a fluidic resistance less than the fluidic resistance of the first input channel such that the first sample fluid received at the first input port initially flows into the first buffering channel;

wherein the surface tension of the buffer fluid in the fluidic capacitor causes the first sample fluid in the first buffering channel to flow through the first input channel and laminarly in the main channel; and the main channel is free of diffusion ports between the first and second ends of thereof.

2. The device of claim 1 wherein the body further includes a second input channel having an output end communicating with the first end of the main channel and an input end communicating with the first input port, the second input channel having fluidic resistance.

3. The device of claim 1 wherein the body further includes a second input channel having an output end communicating with the first end of the main channel and an input end communicating with a second input port, the second input channel having fluidic resistance.

4. The device of claim 3 wherein the fluid capacitor, the first input port and the second input port have cross sectional areas, and wherein the cross sectional area of the fluid capacitor is greater than the cross sectional areas of the first and second input ports.

5. The device of claim 1 wherein the first input channel has a cross sectional area, and wherein the first buffering channel has a cross sectional area greater than the cross sectional area of the first input channel.

6. A device for controlled laminar flow patterning of at least one sample fluid, comprising:

a body defining a channel network, the channel network including:

a main channel extending along a longitudinal axis and having a first end and a second end defining an output port;

a first input channel having an output end interconnected to and communicating with the first end of the main channel and an input end interconnected to and communicating with a first input port, the first input channel having a fluidic resistance;

a fluidic capacitor;

a first buffering channel having a first end directly interconnected to and communicating with the first input port and a second end interconnected to and communicating with the fluidic capacitor, the first buffering channel configured to have a fluidic resistance less than the fluidic resistance of the first input channel;

a second input channel having an output end interconnected to and communicating with the first end of the main channel and an input end interconnected to and communicating with a second input port, the second input channel having fluidic resistance; and a second buffering channel having a first end directly interconnected to and communicating with the second input port and a second end interconnected to and communicating with the fluidic capacitor, the first buffering channel configured to have a fluidic resistance less than the fluidic resistance of the first input channel.

7. The device of claim 6 further comprising a buffering solution within the channel network and wherein:

the at least one sample fluid includes a first sample fluid and a second sample fluid; and the fluidic capacitor urges laminar flow of the first and second sample fluids in the main channel in response to the asynchronous depositing of the first sample fluid in the first input port and the second sample fluid in the second input port.

8. The device of claim 7 wherein:

the first and second input channels have cross sectional areas;

the first and second buffering channels have cross sectional areas;

the cross sectional area of the first buffering channel is greater than the cross sectional area of the first input channel; and the cross sectional area of the second buffering channel is greater than the cross sectional area of the second input channel.

* * * * *